(12) United States Patent  
Rahn (10) Patent No.: US 10,498,478 B2
(45) Date of Patent: Dec. 3, 2019

(54) REDUCED POWER DISSIPATION OPTICAL INTERFACE USING REMOTE LASERS

(71) Applicant: Infinera Corporation, Sunnyvale, CA (US)

(72) Inventor: Jeffrey T. Rahn, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/483,017

(22) Filed: Apr. 10, 2017

(65) Prior Publication Data

US 2018/0294887 A1  Oct. 11, 2018

(51) Int. Cl.
*H04J 14/02* (2006.01)
*H04B 10/40* (2013.01)
*H04B 10/2587* (2013.01)

(52) U.S. Cl.
CPC .......... *H04J 14/02* (2013.01); *H04B 10/2587* (2013.01); *H04B 10/40* (2013.01); *H04J 14/0256* (2013.01)

(58) Field of Classification Search
CPC ............... H04J 2014/0253; H04J 14/02; H04J 14/0227; H04J 14/0247; H04J 14/0252
See application file for complete search history.

(56) References Cited

U.S. PATENT DOCUMENTS

| | | | |
|---|---|---|---|
| 5,790,287 A * | 8/1998 | Darcie | H04B 10/07 379/257 |
| 2003/0002776 A1* | 1/2003 | Graves | H04J 14/02 385/16 |
| 2004/0202473 A1* | 10/2004 | Nakamura | H04J 14/02 398/85 |
| 2005/0053324 A1* | 3/2005 | Ridgway | G02B 6/12019 385/23 |
| 2005/0053377 A1* | 3/2005 | Yoo | H04B 10/299 398/79 |
| 2006/0115269 A1* | 6/2006 | Shin | B82Y 10/00 398/71 |
| 2006/0140631 A1* | 6/2006 | Brolin | H04J 14/0226 398/79 |
| 2006/0146855 A1* | 7/2006 | Kani | H04J 14/0226 370/430 |
| 2006/0239609 A1* | 10/2006 | Sorin | H04J 14/02 385/24 |

(Continued)

*Primary Examiner* — Tanya T Motsinger
(74) *Attorney, Agent, or Firm* — David L. Soltz (57) ABSTRACT

Methods, systems, and devices for implementing optical interface and multiplexing devices. An input optical signal is received over an input fiber by an optical interface device. A modulated optical signal and an unmodulated optical signal are demultiplexed from the input optical signal, the unmodulated optical signal is modulated based on a data signal to generate an output optical signal; and the output optical signal is transmitted over an output fiber. A modulated optical signal is received over a network connection from an optical network by an optical multiplexing device. An unmodulated optical signal is generated using a generator device; the unmodulated optical signal and a signal that includes the modulated optical signal are multiplexed using an optical multiplexer to generate an output signal; and the output signal is transmitted over an output fiber to the optical interface device.

17 Claims, 4 Drawing Sheets

(56) References Cited

U.S. PATENT DOCUMENTS

| | | | | |
|---|---|---|---|---|
| 2007/0206948 A1* | 9/2007 | Lee | ................. | H04J 14/02 398/71 |
| 2010/0142954 A1* | 6/2010 | Rossetti | ................. | H04J 14/02 398/72 |
| 2010/0214651 A1* | 8/2010 | Kim | ................. | B82Y 20/00 359/344 |
| 2010/0329680 A1* | 12/2010 | Presi | ................. | H04B 10/2587 398/79 |
| 2011/0033187 A1* | 2/2011 | Rossetti | ................. | H04J 14/02 398/79 |
| 2011/0091214 A1* | 4/2011 | Cheng | ................. | H04B 10/2587 398/91 |
| 2011/0211834 A1* | 9/2011 | Ansari | ................. | H04J 14/0282 398/58 |
| 2012/0155879 A1* | 6/2012 | Urban | ................. | H04B 10/2587 398/79 |
| 2013/0089330 A1* | 4/2013 | Chow | ................. | H04B 10/272 398/66 |
| 2015/0010298 A1* | 1/2015 | Menard | ................. | H04L 69/40 398/5 |
| 2017/0346592 A1* | 11/2017 | Liu | ................. | G02B 6/28 |
| 2018/0294887 A1* | 10/2018 | Rahn | ................. | H04J 14/02 |

* cited by examiner

REDUCED POWER DISSIPATION OPTICAL INTERFACE USING REMOTE LASERS

FIELD OF INVENTION

The disclosed embodiments are generally related to optical communications networking.

BACKGROUND

Routers are communications networking devices that forward data packets between computer networks. As such, a router typically includes at least one data line from each of two or more computer networks.

Routers direct traffic between and among computer networks, typically forwarding data packets from one router to another router until a destination node is reached. When a data packet is received on one of the data lines, the router typically reads address information in the packet to determine its destination node. The router then uses information, such as a routing table, to direct the packet to the next node (e.g., another router) on its way to the destination node.

Routers can be simple, connecting a home computer to an internet service provider. Other routers are more complex, connecting large networks to core routers for high speed data transfer over fiber optic trunks. Routers can be employed in various topologies.

Routers and other communications networking devices typically include interface devices for communications with other routers (or other communications devices). Such devices may be used, for example, to interface a network device motherboard to a fiber optic cable for communications with another network device. Interface devices used to interface a network device to a fiber optic cable can be referred to as optical interface devices, or optical transceivers. A router is a convenient example of a communications networking device, however network devices which use optical interface devices can include routers, switches, hubs, or other networking components.

One example of an optical interface device is a Quad Small Form-factor Pluggable ("QSFP") transceiver. A QSFP is a compact, hot-pluggable transceiver used for data communications applications. The form factor and electrical interface are specified by a QSFP multi-source agreement ("MSA") under the auspices of the Small Form Factor Committee. The QSFP follows an industry format jointly developed and supported by many network component vendors. The format specification is evolving to enable higher data rates. As of May 2013, the highest possible rate for a QSFP interface device is 4×28 Gbit/s (referred to as "QSFP28").

The form factor of a QSFP28 transceiver is constrained in size in order to enable a number of such transceivers to be installed in a panel of a router or switch, providing a suitable amount of bandwidth density in a given amount of space. Because of the exterior size constraint of the QSFP28 form factor, the size and capability of components within the transceiver is limited. For example, a laser within the QSFP28 transceiver would be limited in power due to a limitation on its size and/or a limitation on the amount of heat possible to dissipate for the size of the transceiver. It is noted that the form factor also only permits one optical fiber input, and one optical fiber output.

Generations of refinements of this interface have led to highly power-optimized components designed to fit within this form factor. However due to the limitations imposed on its capabilities by its size constraint, a current QSFP28 transceiver only provides the capability to send data over an optical fiber for a limited distance (possibly 1 km or so) to another router port or to a long-distance transmission box.

In order to satisfy datacenter interconnect needs, an additional transceiver, having a client-facing interface connected to a line-facing interface, can be used to boost the reach of the QSFP transceiver. This additional transceiver, which can be referred to as a "gray" interface, can be effective but can require the customer to buy two transceiver devices for each desired line interface, increasing costs. The optical fiber reach that can be achieved with such client interfaces can be ~10 km for a laser wavelength of 1310 nm. However, the gray interface typically can only support one 100G interface. The interconnection bandwidth required in a data center is high however, and interfaces supporting on the order of a terrabit of data would be preferred to a 100G interface.

For this reason, it may be preferable to transmit data over the optical fiber using Dense Wavelength Division Multiplexing (DWDM). In some cases, DWDM can allow 40 channels of 100G on one fiber when using PAM4 modulation. However, the digital signal processor (DSP), forward error correction (FEC), and laser powers are all higher for 100G PAM4 over longer links at 1550 nm with stringent wavelocking requirements. This total added power can exceed the thermal capability of a QSFP28 (or other optical transceiver) however. Accordingly, it may be desired to provide an optical transceiver capable of outputting laser light at a higher power while maintaining current form factor limitations.

SUMMARY

Some alternatives provide a method implemented in an optical interface device. The method includes receiving an input optical signal over an input fiber, demultiplexing a modulated optical signal and an unmodulated optical signal from the input optical signal, modulating the unmodulated optical signal based on a data signal to generate an output optical signal; and transmitting the output optical signal over an output fiber.

In some alternatives, the unmodulated optical signal is generated by a laser disposed externally to the optical interface device. In some alternatives, the unmodulated optical signal includes a laser signal. In some alternatives, the data signal is received over input/output circuitry from a client device. In some alternatives, the client device includes a router. In some alternatives, the input optical signal is received over the input fiber from an optical communications network. In some alternatives, the input optical signal is received over the input fiber from an optical multiplexer device.

Some alternatives provide an optical interface device. The optical interface device includes an input fiber; an output fiber; an optical demultiplexing device which demultiplexes a modulated optical signal and an unmodulated optical signal from an input optical signal received over the input fiber; a modulator device which modulates the unmodulated optical signal based on a data signal to generate an output signal; and a transmitter device which transmits the output signal over the output fiber.

In some alternatives the unmodulated optical signal is generated by a laser disposed externally to the optical interface device. In some alternatives, the unmodulated optical signal includes a DWDM laser signal. In some alternatives, the optical interface device includes input/output circuitry which communicates with a client device, and the data signal is received from the client device over the input/output circuitry. In some alternatives, the client device includes a router. In some alternatives, the input optical signal is received over the input fiber from an optical communications network. In some alternatives, the input optical signal is received over the input fiber from an optical multiplexer device.

Some alternatives provide a method implemented in an optical multiplexing device. The method includes receiving a modulated optical signal over a network connection from an optical network; generating an unmodulated optical signal using a generator device; multiplexing the unmodulated optical signal and a signal that includes the modulated optical signal using an optical multiplexer to generate an output signal; and transmitting the output signal over an output fiber using a transmitter device.

In some alternatives, the generator device includes a laser. In some alternatives, the unmodulated optical signal includes a DWDM laser signal. In some alternatives, the method includes transmitting the output signal over the output fiber to an optical interface device.

Some alternatives provide an optical multiplexing device. The optical multiplexing device includes an output fiber; a network connection that receives a modulated optical signal from an optical network; a generator device that generates an unmodulated optical signal; an optical multiplexer that multiplexes the unmodulated optical signal and a signal comprising the modulated optical signal to generate an output signal; and a transmitter device that transmits the output signal over the output fiber.

In some alternatives, the generator device includes a laser. In some alternatives, the unmodulated optical signal includes a DWDM laser signal. In some alternatives, the transmitter device transmits the output signal over the output fiber to an optical interface device.

DETAILED DESCRIPTION OF THE PREFERRED EMBODIMENT(S)

Typical optical interface devices, which can also be referred to as optical transceivers, transmit data over limited distances. For example, a QSFP28 transceiver may have an optical reach of 10 km or less using a shorter laser wavelength (e.g., 1310 nm). It may be preferable in some cases to transmit over longer links using a longer laser wavelength (e.g., 1550 nm), using DWDM, and/or using stringent wavelocking requirements. DSP, FEC, and laser powers are all higher for 100G PAM4 in this case however, and the total added power can exceed the thermal capability of a QSFP28 (or other optical transceiver). Accordingly, it may be desirable to input an external laser source to the optical interface device, rather than incorporating a laser source into the optical interface device. In some form factors (e.g., QSFP28) the optical interface device only supports two line-side fibers, where one would be required for input from the network to the optical interface device and one would be required for output to the network from the optical interface device. In such cases, a separate fiber for inputting an unmodulated laser signal for modulating by the optical interface device is not available.

Accordingly, various alternatives discussed herein describe multiplexing an unmodulated optical signal (e.g., an unmodulated DWDM laser signal of a desired wavelength) with a modulated optical signal (e.g., an optical data signal received over an optical fiber from a network) for input to the optical interface device, and demultiplexing the multiplexed signal within the optical interface device to separate the unmodulated optical signal and the modulated optical signal. The demultiplexed modulated optical signal is processed for output from the client side of the optical interface device (e.g., to a router or computer) and the demultiplexed unmodulated optical signal is fed to an output stage of the optical interface device. If the optical interface device has a data signal to output to the optical fiber (e.g., from the router or computer to a network), a modulator of the optical interface device modulates the unmodulated optical signal based on the data signal for output to the optical fiber.

Various devices described herein are discussed with respect to a "line side" and a "client side". The line side is the portion of the device which communicates with a communications network, directly or indirectly, such as the internet. The client side is the portion of the device which communicates with a data source and/or data consumer, such as a router or a computer for example. Thus the client side of an optical interface device communicates with a router, computer, or other data consumer and/or source in which it is installed, and the line side of the optical interface device communicates with a fiber link, the internet, or other suitable computer communications network over an optical fiber.

Optical communications use light to carry information over various media. The light can be visible or invisible, and can be coherent (i.e., laser) or incoherent depending on the desired application. Optical signals can be communicated in free space (e.g., through the air or a vacuum) and/or over a solid medium (e.g., an optical fiber, such as a multi-mode fiber). The example optical signals described herein are described with respect to visible wavelength laser signals, however it is noted that invisible wavelength lasers, or other types of light signals can be used in alternative implementations.

Figure 1:
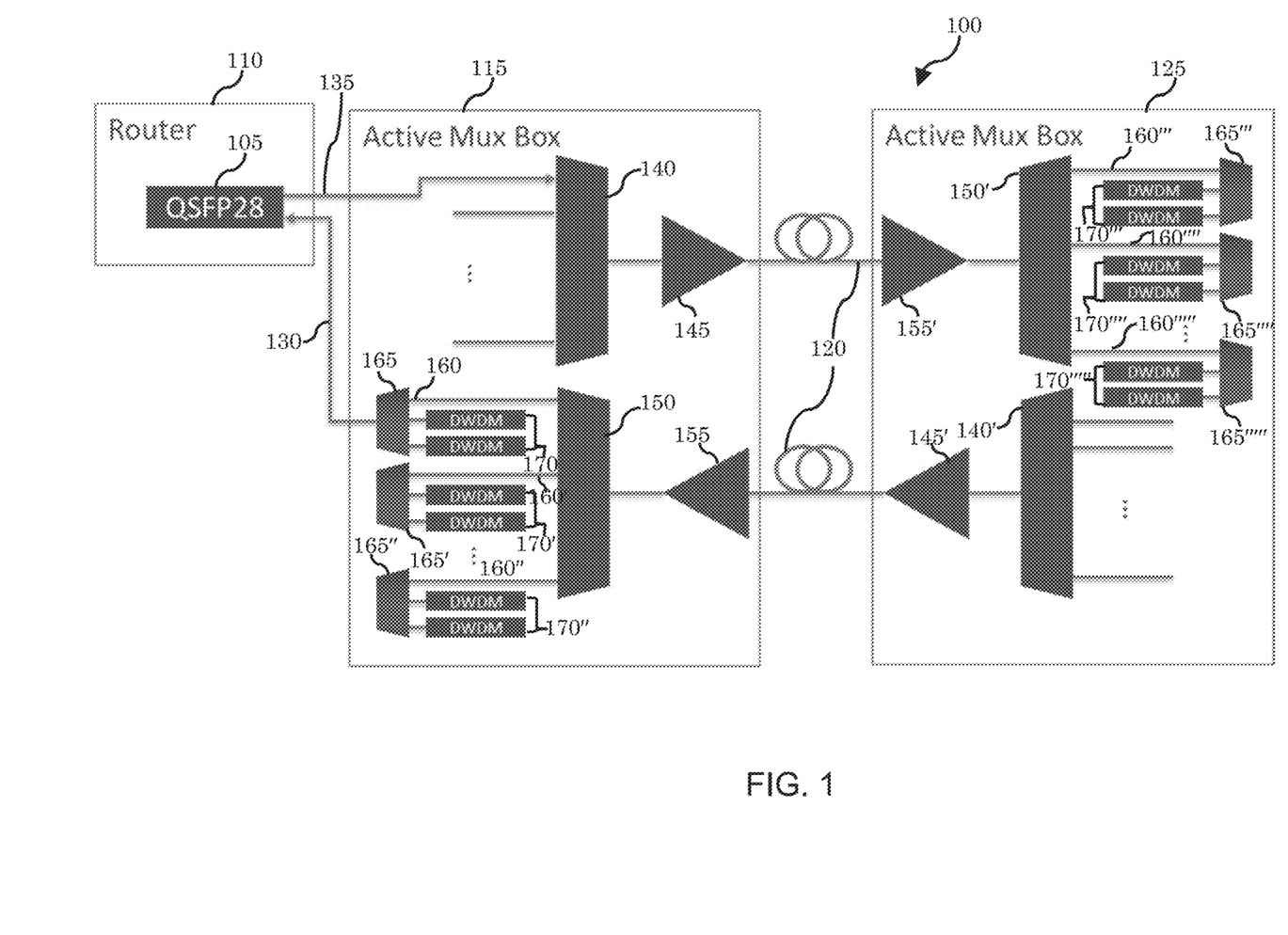
FIG. 1 is a block diagram showing an example system including an optical interface port.

FIG. 1 is a block diagram showing a portion of an example system 100 which includes an optical interface device 105. System 100 is an optical communications system which includes a router 110, a local active multiplexer 115, a communications link 120, and a remote active multiplexer 125. Communications link 120 can include an optical fiber or any other suitable optical communications medium. Local active multiplexer 115 and remote active multiplexer 125 are described as local and remote respectively to designate their proximity to router 100. These components are illustrative, and it is understood that system 100 can include a variety of other components, such as a remote router (not shown) or other node. Router 110 can communicate with the remote router or other node via the local active multiplexer 115, communications link 120, and remote active multiplexer 125.

Router 110 includes an optical interface device 105. Optical interface device 105 has a form factor which is limited to two line-side fibers, input fiber 130 and output fiber 135. Optical interface device 105 is an optical transceiver operable to receive data via optical signals from local active multiplexer 115 over input fiber 130, and operable to transmit data via optical signals to local active multiplexer 115 over output fiber 135. In this example, optical interface device 105 is a pluggable optical transceiver which adheres to the Quad Small Form-factor Pluggable 4×28 Gbit/s (QSFP28) form factor, as promulgated by the Small Form Factor Committee™ electronics industry group, however it is noted that other form factors, including other maximum numbers of line-side fibers, are possible. It is noted that in other implementations optical interface 105 is included in equipment other than router 110, such as a personal computer or computer server.

Local active multiplexer 115 is operable on its client side to receive optical data signals from optical interface device 105 over output fiber 135. Local active multiplexer 115 is operable on its line side to transmit optical data signals over communications link 120. For example, local active multiplexer 115 is operable to multiplex various signals from its client side, including signals input from optical interface device 105 over output fiber 135, using multiplexer 140. Multiplexer 140 (and other multiplexers described herein) can include, for example, an optical multiplexer such as a DWDM multiplexer, a prism, or another suitable device. Multiplexer 140 is operable to output a multiplexed signal to an output amplifier 145 for transmission over communications link 120. The multiplexed signal is transmitted, in this example, to remote active multiplexer 125.

Local active multiplexer 115 is operable on its client side to transmit data via optical signals to optical interface device 105 over input fiber 130. Local active multiplexer 115 is operable on its line side to receive data via optical signals over communications link 120. For example, local active multiplexer 115 is operable to demultiplex various signals from its line side using a demultiplexer 150. Demultiplexer 150 is operable to receive a multiplexed signal from an input amplifier 155 received over communications link 120. The multiplexed signal is received, in this example, from remote active multiplexer 125. Demultiplexer 150 (and other demultiplexers described herein) can include, for example, an optical demultiplexer such as a DWDM demultiplexer, a prism, or another suitable device.

Demultiplexed signal 160 is demultiplexed by demultiplexer 150. Demultiplexed signal 160 includes optical data on two wavelengths. It is noted that in other example implementations, demultiplexed signals can include optical data on a greater or lesser number of wavelengths as appropriate to the configuration of the system. Demultiplexed signal 160 is transmitted to a client-side multiplexer 165, which multiplexes demultiplexed signal 160 with unmodulated carrier wavelength laser signals from each of two lasers 170. The multiplexed signal is transmitted to optical interface device 105 over input fiber 130. Lasers 170 transmit different carrier wavelengths. In this example, lasers 170 are DWDM lasers. It is noted that other types and numbers of lasers can be multiplexed in other implementations. In various different implementations, an arbitrary number of demultiplexed signals can be multiplexed with an arbitrary number of unmodulated carrier wavelength laser signals and input to an optical interface over a single, or a desired number of fibers, based on the physical constraints of optical interface 105.

Local active multiplexer 115 includes other client-side multiplexers 165', 165" and other lasers 170', 170" arranged to handle other demultiplexed signals 160', 160". These structures can be implemented to handle a desired number of demultiplexed signals. In this example, remote active multiplexer 125 includes structures analogous to those in local active multiplexer 115, e.g., input amplifier 155', demultiplexer 150', demultiplexed signals 160''', 160'''', 160''''', client-side multiplexers 165''', 165'''', 165''''', lasers 170''', 170'''', 170''''', output amplifier 145' and multiplexer 140'. It is noted however that remote active multiplexer 125 need not have a structure analogous to local active multiplexer 115.

Figure 2:
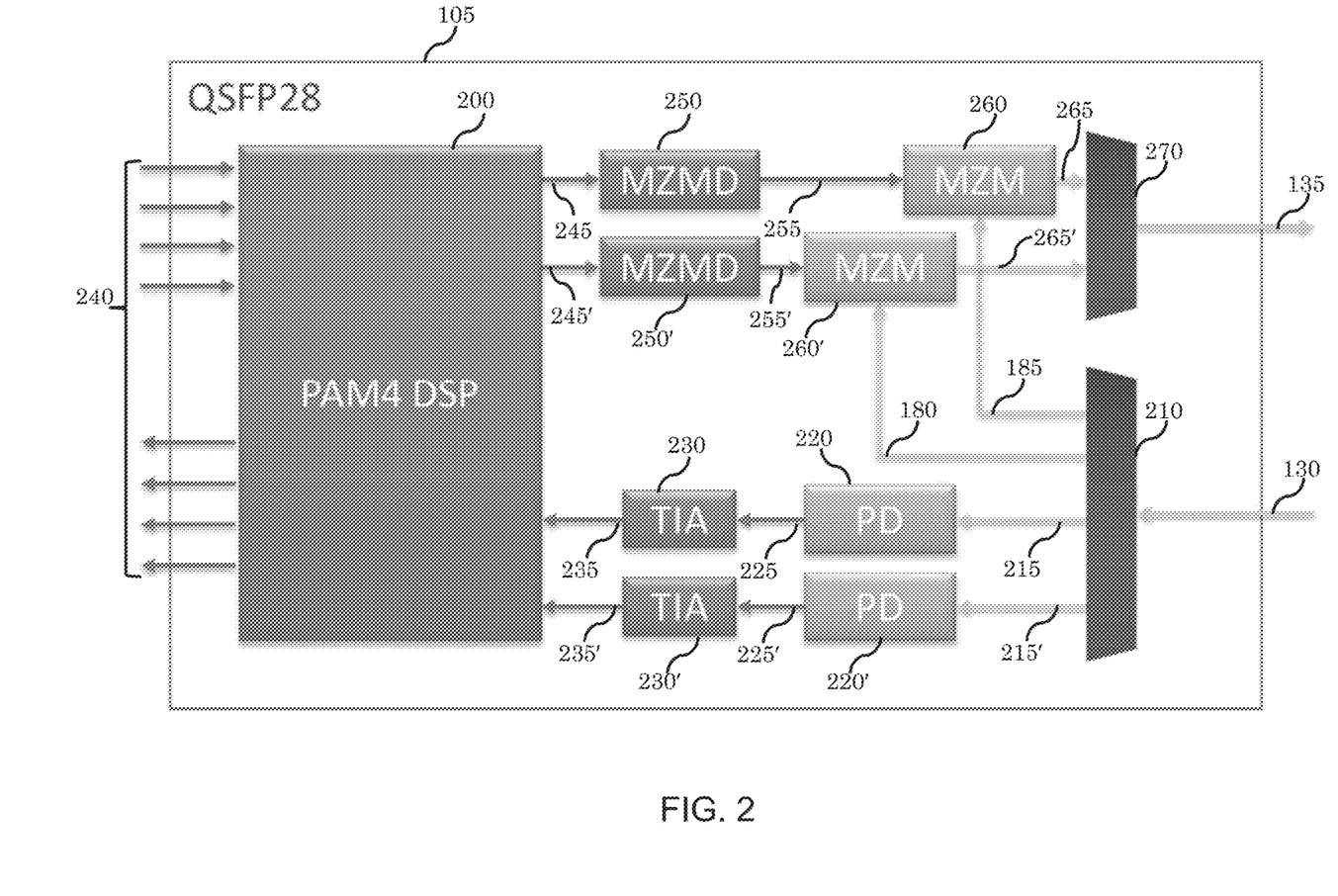
FIG. 2 is a block diagram showing the optical interface port of FIG. 1 in further detail.

FIG. 2 is a block diagram illustrating further detail of optical interface device 105. Optical interface device 105 includes a signal processor 200, line-side input hardware, and line-side output hardware.

The line-side input hardware includes input demultiplexer 210, which receives a multiplexed signal (which includes carrier wavelength laser signals 180, 185 and demultiplexed signal 160) over input fiber 130. Demultiplexer 210 demultiplexes carrier wavelength laser signals 180, 185 from the multiplexed signal and transmits these signals to the output stage as will be described in further detail. Demultiplexer 210 also demultiplexes the demultiplexed signal 160 into optical input signals 215, 215', and transmits these signals to photodetectors (PD) 220 and 220' respectively. PDs 220 and 220' generate electrical input signals 225, 225' based on optical input signals 215, 215', and transmit electrical input signals 225, 225' to trans-impedance amplifiers (TIA) 230, 230' respectively. Other implementations can employ any suitable amplifiers. TIA 230 and 230' generate amplified input signals 235, 235' based on electrical input signals 225, 225' and transmit amplified input signals 235, 235' to signal processor 200. After suitable processing, signal processor 200 transmits input signals based on the amplified input signals 235, 235' to router 110 via client-side input/output lines 240.

Signal processor 200 receives output signals from router 110 via client side input/output lines 240. After suitable processing, signal processor 200 generates electrical output signals 245, 245' respectively based on the output signals and transmits electrical output signals 245, 245' to the output hardware. Output hardware includes drivers 250, 250' which receive the electrical output signals 245, 245' respectively and transmit amplified optical output signals 255, 255' to modulators 260, 260'. Drivers 250, 250' are Mach-Zehnder Multiplexer Drivers (MZMD) and modulators 260, 260' are Mach-Zehnder Modulators in this example. Other implementations can employ any suitable drivers and/or modulators. Modulators 260, 260' also receive carrier wavelength laser signals 180, 185 respectively, and modulate carrier wavelength laser signals 180, 185 based on amplified optical output signals 255, 255' to generate modulated optical output signals 265, 265'. Output multiplexer 270 receives modulated optical output signals 265, 265', multiplexes these signals, and transmits the multiplexed output signal over output fiber 135.

It is noted that some implementations omit, modify, or add components to the components described with respect to FIG. 2. Various implementations demultiplex an input signal which includes at least one unmodulated carrier-wavelength optical signal, and output a modulated optical signal based on the unmodulated carrier-wavelength optical signal. This can have the advantage of enabling a limited form factor optical interface device, such as a QSFP28 optical transceiver, to transmit over a greater range than would be possible using an unmodulated carrier-wavelength optical signal generated by an onboard laser which is constrained by the form factor.

In general, optical interface device 105 receives at least one unmodulated carrier wavelength optical and/or laser signal which is multiplexed with at least one modulated optical and/or laser signal. The optical interface device 105 demultiplexes the unmodulated carrier wavelength signal, and modulates it with data for output. In this way, optical interface device 105 does not require its own internal laser to generate an output signal. The unmodulated carrier wavelength signal can be generated and multiplexed with the modulated input signal by any suitable device or devices external to optical interface device 105.

Table 1 illustrates example reduction in power dissipation within an optical interface device that can be realized using an external laser source, such as in optical interface device 105, as compared with using an internal laser source of the same characteristics.

TABLE 1

| Component | Dissipated Power (internal DWDM laser) | Dissipated Power (external DWDM laser) |
|---|---|---|
| MZMD | 1.5 | 1.5 |
| PD | 0.2 | 0.2 |
| MZM | 0.5 | 0.5 |
| DWDM laser ×2 | 2 | 0 |
| DSP | 1.8 | 1.8 |
| TIA | 1.0 | 1.0 |
| Total | 7 | 5 |

In Table 1, power dissipated within an optical interface device is expressed in watts. As shown, the same number of watts is dissipated within the optical interface for all components except for the two DWDM lasers, which are implemented internally and externally respectively. Because these lasers consume a significant amount of power, the total power dissipated within the optical interface device can be significantly decreased by implementing these components outside of the optical interface device.

Figure 3:
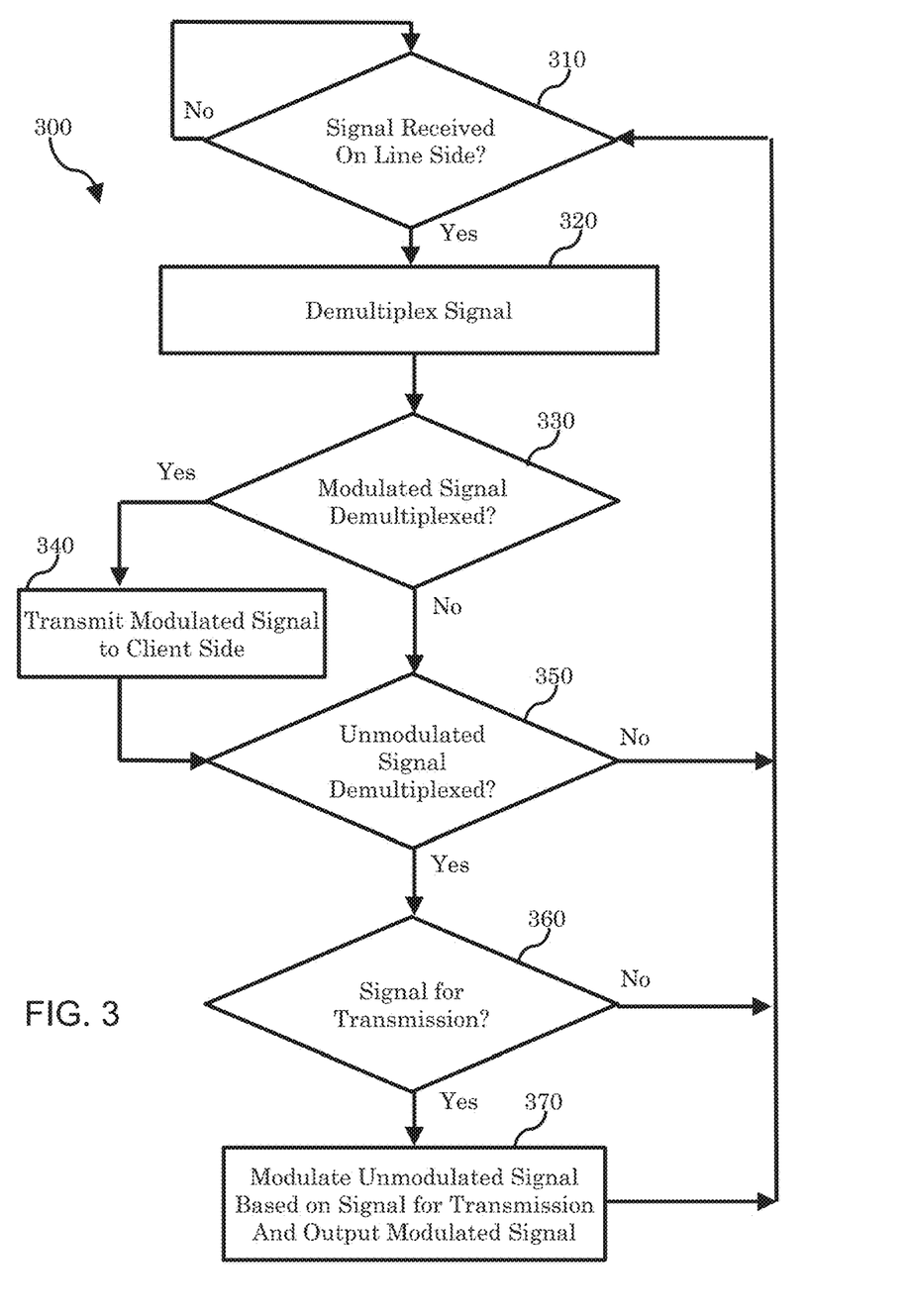
FIG. 3 is a flow chart illustrating an example method operable with the system of FIG. 1 and the optical interface device of FIG. 2.

FIG. 3 is a flow chart illustrating an example method 300 operable with the system of FIG. 1 and the optical interface device of FIG. 2. Method 300 illustrates example operation of an optical interface device, such as optical interface device 105, to transmit signals between a network and a communications device such as a router.

On a condition 310 that a signal is received from a network (i.e., on the line side of optical interface device 105 via input fiber 130), the signal is demultiplexed in step 320 (e.g., by optical demultiplexer 210). On a condition 330 that a modulated input signal (e.g., optical input signal 215) is demultiplexed from the signal received on the line side, the modulated input signal is transmitted to the client side (e.g., as converted via PD 220 and TIA 230), and may be processed (e.g., by signal processor 200) and sent to a router (e.g., router 110 via client side input/output lines 240).

Whether or not a modulated signal is demultiplexed, it is determined whether an unmodulated optical signal (e.g., an unmodulated DWDM laser such as carrier wavelength laser signal 180) is demultiplexed from the signal that was determined to be received on the line side of the optical interface device in step 310. On a condition 350 that an unmodulated optical signal is demultiplexed, and on a condition that the optical interface device has a signal to transmit over the network (e.g., to transmit over network 120 from router 110 via signal processor 200), the optical interface device modulates the unmodulated optical signal based on the signal to transmit (e.g., using MZM 260) and transmits the modulated signal over the network.

Figure 4:
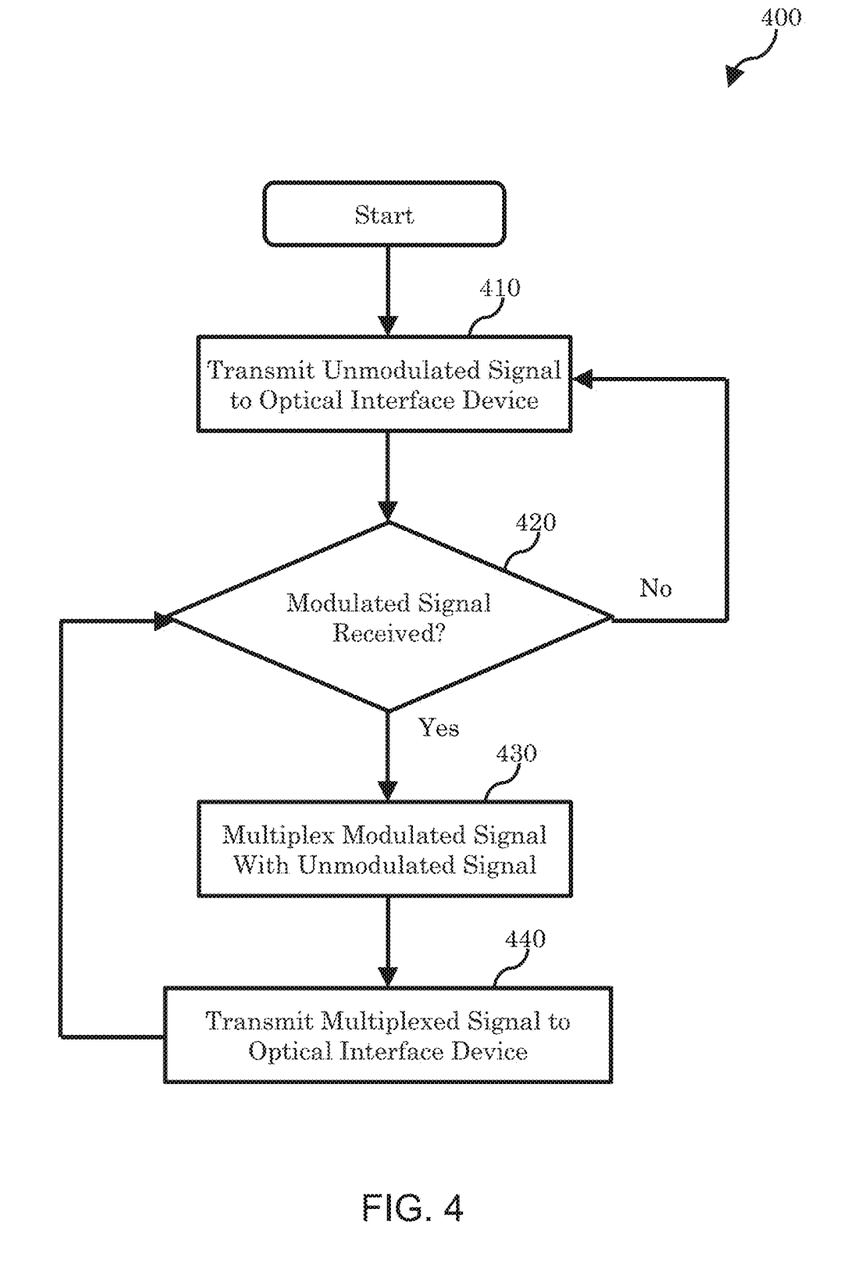
FIG. 4 is a flow chart illustrating another example method operable with the system of FIG. 1 and the optical interface device of FIG. 2.

FIG. 4 is a flow chart illustrating another example method 400 operable with the system of FIG. 1 and the optical interface device of FIG. 2. Method 400 illustrates example operation of an active multiplexer device, such as local active multiplexer 115, to transmit signals to and receive signals from an optical interface device such as optical interface device 105.

In operation, the active multiplexer device transmits an unmodulated optical signal to the optical interface device in step 410. In some implementations, the unmodulated optical signal is an unmodulated DWDM laser such as carrier wavelength laser signal 180. In some implementations, the unmodulated optical signal is multiplexed with other unmodulated optical signals and/or modulated optical signals, either by the active multiplexer device or another device.

On a condition 420 that the active multiplexer device receives a modulated optical signal for transmission to the optical interface device, the modulated optical signal is multiplexed with the unmodulated optical signal in step 430, and the resulting multiplexed optical signal is transmitted to the optical interface device in step 440.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method implemented, comprising:
   receiving an input Dense Wavelength Division Multiplexing (DWDM) optical signal over an input fiber, the input DWDM optical signal including a plurality of modulated optical signals;
   demultiplexing the plurality of modulated optical signals to provide a plurality of demultiplexed modulated optical signals;

supplying a first unmodulated optical signal to a first input of a multiplexer, the first unmodulated optical signal being output from a first laser coupled to the first input of the multiplexer;

supplying a second unmodulated optical signal to a second input of the multiplexer, the second unmodulated optical signal being output from a second laser coupled to the second input of the multiplexer, the DWDM optical signal excluding the first and second unmodulated optical signals;

multiplexing the first unmodulated optical signal, the second unmodulated optical signal, and one of the of the plurality of demultiplexed modulated optical signals to provide a multiplexed optical signal;

demultiplexing the multiplexed optical signal to provide a first demultiplexed unmodulated optical signal, a second demultiplexed unmodulated optical signal, and a demultiplexed input modulated optical signal;

modulating the first demultiplexed unmodulated optical signal based on a first data signal to generate a first output optical signal;

modulating the second demultiplexed unmodulated optical signal based on a second data signal to generate a second output optical signal; and transmitting the first and second output optical signals over an output fiber.

2. The method of claim 1, wherein the unmodulated optical signal comprises a laser signal.

3. The method of claim 1, further comprising receiving the data signal over input/output circuitry from a client device.

4. The method of claim 3, wherein the client device comprises a router or switch.

5. The method of claim 1, further comprising receiving the input optical signal over the input fiber from an optical communications network.

6. The method of claim 1, further comprising detecting the demultiplexed input modulated optical signal.

7. An apparatus comprising:
an optical fiber input carrying an input optical signal, the input optical signal being a Dense Wavelength Division Multiplexing (DWDM) optical signal including a plurality of modulated optical signals;
an optical fiber output;
a first optical demultiplexing device operable to demultiplex the DWDM optical signal supplied from the optical fiber input, such that the optical demultiplexer device supplies a plurality of demultiplexed modulated optical signals;
a multiplexer:
a first laser coupled to a first input of the multiplexer, the first laser providing a first unmodulated optical signal;
a second laser coupled to a second input of the multiplexer, the second laser providing a second unmodulated optical signal, the DWDM optical signal excluding the first and second unmodulated optical signals, such that the multiplexer multiplexes the first unmodulated optical signal, the second unmodulated optical signal, and one of the plurality of demultiplexed modulated optical signals to provide a multiplexed optical signal;
a second optical demultiplexer that demultiplexes the multiplexed optical signal to provide a first demultiplexed unmodulated optical signal, a second demultiplexed unmodulated optical signal, and a demultiplexed input modulated signal;
a first modulator device operable to modulate the first demultiplexed unmodulated optical signal based on a first data signal to generate a first output signal, which is supplied to the optical fiber output; and
a second modulator device operable to modulate the second demultiplexed unmodulated optical signal based on a second data signal to generate a second output signal, which is supplied to the optical fiber output.

8. The apparatus of claim 7, further comprising a laser that supplies the unmodulated optical signal laser signal.

9. The apparatus of claim 7, further comprising input/output circuitry operable to communicate with a client device, wherein the data signal is received from the client device over the input/output circuitry.

10. The apparatus of claim 9, wherein the client device comprises a router or switch.

11. The apparatus of claim 7, wherein the input optical signal is received over the optical fiber input from an optical communications network.

12. The apparatus of claim 7, further comprising a photodiode that receives at least a portion of the demultiplexed input modulated signal.

13. An optical interface system comprising an optical interface device operatively coupled to an optical multiplexing device;
the optical multiplexing device comprising:
an optical fiber output of the optical multiplexing device;
a network connection operable to receive a Dense Wavelength Division Multiplexing (DWDM) optical signal including a plurality of modulated optical signals from an optical network;
a first optical demultiplexing device operable to demultiplex the DWDM optical signal, such that the optical demultiplexer device provides a plurality of demultiplexed modulated optical signals;
a first laser that supplies a first unmodulated optical signal;
a second laser that supplies a second unmodulated optical signal, the DWDM optical signal excluding the first and second unmodulated optical signals;
an optical multiplexer having first and second inputs coupled to the first and second lasers, respectively, the optical multiplexer being operable to multiplex the first unmodulated optical signal, the second unmodulated optical signal, and one of the plurality of demultiplexed modulated optical signals to provide a multiplexed signal, which is supplied to the optical fiber output; and
the optical interface device comprising:
an optical fiber input operatively coupled to the optical fiber output of the optical multiplexing device;
an optical fiber output of the optical interface device;
a second optical demultiplexing device operable to demultiplex the multiplexed signal to provide a demultiplexed modulated optical signal, a first demultiplexed unmodulated optical signal, and a second demultiplexed unmodulated optical signal;
a first modulator device operable to modulate the first demultiplexed unmodulated optical signal based on a first data signal to generate a first output signal, which is supplied to the optical fiber output; and
a second modulator device operable to modulate the second demultiplexed unmodulated optical signal based on a second data signal to generate a second output signal, which is supplied to the optical fiber output.

14. The optical interface system of claim 13, further comprising a laser, wherein the unmodulated optical signal is output from the laser.

15. The optical interface system of claim 13, wherein the optical interface device is operable to receive the data signal over input/output circuitry from a client device.

16. The optical interface system of claim 15, wherein the client device comprises a router or switch.

17. The optical interface system of claim 13, further comprising a photodiode that receives at least a portion of the demultiplexed modulated signal.

* * * * *